May 26, 1970     H. F. GEIGER     3,513,551
DRAFTING SLOPE GAUGE
Filed June 20, 1969
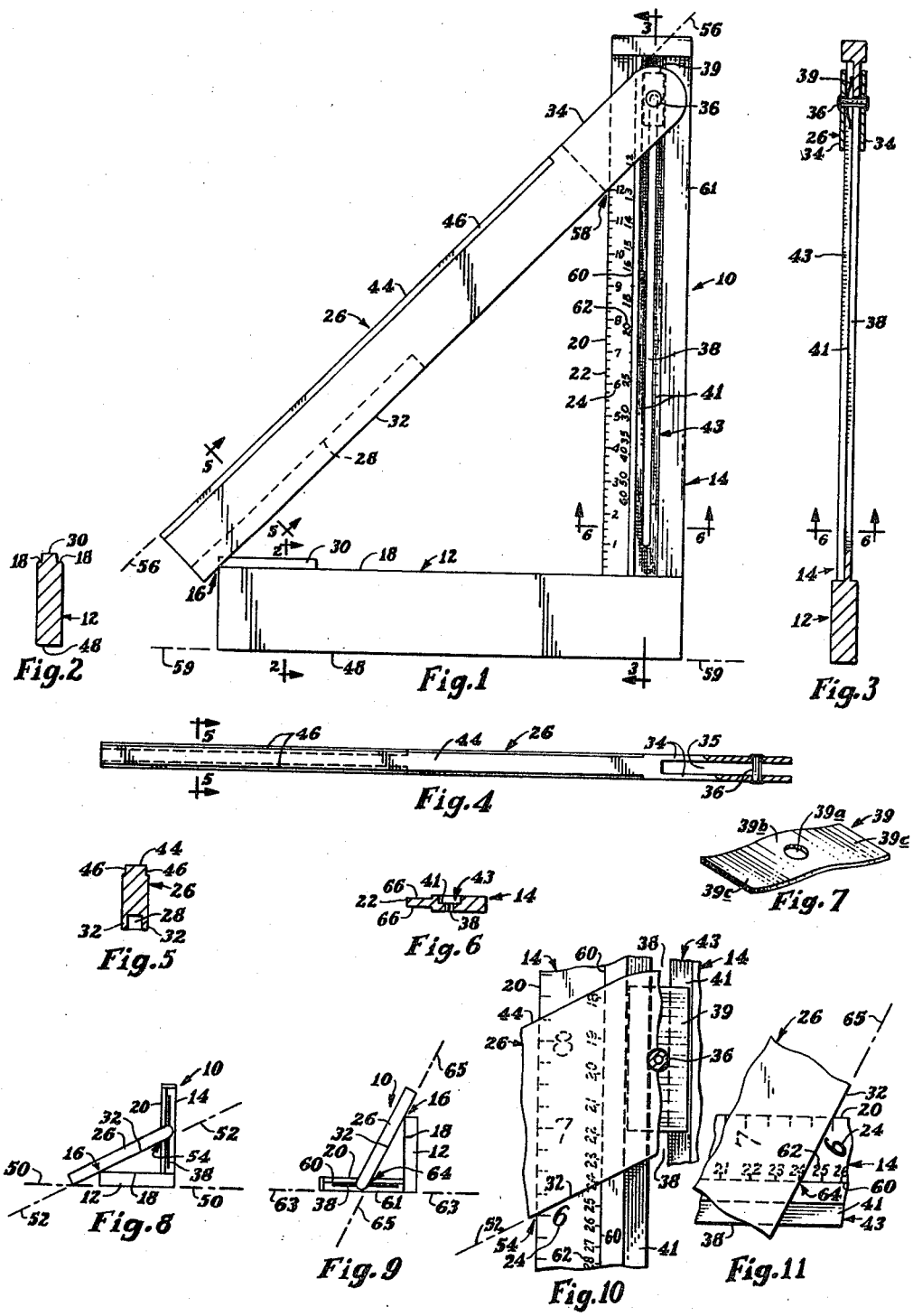
HANS F. GEIGER,
INVENTOR
BY Robert A. Spray
ATTORNEY

United States Patent Office 3,513,551
Patented May 26, 1970

3,513,551
DRAFTING SLOPE GAUGE
Hans F. Geiger, 5845 N. New Jersey St.,
Indianapolis, Ind. 46220
Continuation-in-part of application Ser. No. 735,449,
June 7, 1968. This application June 20, 1969, Ser.
No. 835,207
Int. Cl. B43l 7/00
U.S. Cl. 33—92                                16 Claims

ABSTRACT OF THE DISCLOSURE

An L-shaped slope-indicator gauge, primarily useful for draftmens' use, in which a pair of fixed scales on one of the arms provide respectively for the reading of relatively low and relatively high slopes by the orienting or turning over of the device so as to use a specific one or the other tool-arm as its base; and a movable arm is adjustably held to the arms in any selected position to provide the specific slope-reading desired. Spring-tension means assure a desired frictional holding of a set position or reading, yet permit adjustment of the reading when desired.

---

This is a continuation-in-part of applicant's pending United States patent application, Ser. No. 735,449, filed June 7, 1968, entitled "Slope Tool."

This invention relates to a slope indicator gauge tool, generally of an L-shape having fixed arms, and a movable indicator arm, with adjustability and other characteristics as herein detailed.

Concepts of the invention provide that slopes substantially exceeding twelve inches rise per twelve inches run can be measured or drawn by the use of a second or high-slope scale parallel to the low-slope scale.

The scales run in opposite directions; and the calibrations are such that the instrument is used for different relatively low slopes by a change of the "rise" measurement, while differences in relatively higher slopes are measured by changing the "run" measurement, and correspondingly setting the instrument so that one or the other of the fixed arms is set horizontally.

Moreover, the concepts provide that although the slope is set or read by the observing of intersecting lines or edges, the intersection is always at an angle of at least forty-five degrees; thus providing relative ease of slope-reading in view of the large angle at which the lines or edges intersect.

Further, the concepts provide that the adjustment-holding means snugly and firmly retain the desired slope-reading desired, against inadvertent change of adjustment, without the bother of clamping means; and the adjustment-holding means are wholly within the plane of the arms, permitting the device to be turned over, for optional use of either side thereof, without clamping means protruding from the device face which would be lying on the draftman's work-table.

The above description is rather generalized and of introductory nature; and the above and other of the concepts and features are given in more detail in the following description of an illustrative embodiment of the invention, reference being had to the accompanying somewhat schematic drawings, in which:

FIG. 1 is a view of a drafting slope gauge according to the inventive concepts;

FIG. 2 is a cross sectional detail view of a base member arm thereof, this view taken as indicated by section-line 2—2 of FIG. 1;

FIG. 3 is a cross sectional view of the other arm of the device, this view being taken generally as indicated by section-line 3—3 of FIG. 1;

FIG. 4 is a plan view of the movable or indicator member shown in FIG. 1, an end portion thereof shown broken away and in section;

FIG. 5 is a detail cross sectional view of the indicator member, taken as indicated by section-lines 5—5 of FIG. 1 and FIG. 4;

FIG. 6 is a detail cross sectional view of the scale member arm shown in FIGS. 1 and 3, the view being taken as indicated by section-lines 6—6 of FIG. 1 and FIG. 3;

FIG. 7 is a view of an adjustment-holding spring member shown in FIGS. 1 and 3;

FIGS. 8 and 9 are schematic views, in greatly reduced scale, illustrating the device in use; and FIGS. 10 and 11 are substantially enlarged detail views of the instrument in use, as in FIGS. 8 and 9, respectively, showing the portions thereof in the region of where the readings or slope-determinations are observed or read.

As shown in the drawings, a slope indicator gauge tool 10 provides an instrument by which a draftsman can measure or lay out a line at any given slope; and as shown, it states and provides for the laying out of line-slope in terms of rise per unit of run, and more particularly the inches (or other units) of rise per twelve inches (or the same other units) of run. Such designation, rather than slope-angle or other designation, is a convenient designation in many use-situations.

As shown, the tool 10 includes a pair of perpendicularly-related arms, a first arm 12 being referred to herein sometimes as a "base" even though the tool 10 is not always oriented so that the arm 12 is a base in use; and a second arm 14 which is sometimes referred to herein as a "scale-arm." As shown in FIG. 3, the arms 12 and 14 may be, and desirably are, formed as parts of an integrally-formed L-shaped member.

The base arm 12 is provided with a fixed-location abutment, here specifically its outer corner 16 on its inner edge 18; and the corner abutment 16 is a set or fixed distance from a first scale-line 20 provided on the scale arm 14, the first scale-line 20 being shown as the inner edge 22 of that scale-arm 14.

The first scale-line 20 is marked with a first set of calibrations 24, which are shown as uniform and beginning on the base-arm 18. Moreover, the first calibrations 24 are of such a spacing that there are twelve units thereof in the same distance as the distance from the abutment corner 16 to the scale-line 20, which extends prependicularly from the base-arm edge 18.

A third or indicator arm 26 is provided, being movable and selectively interconnecting the base-arm 12 and the scale-arm 14 to designate and measure line-slope, as now will be discussed. It is desirably transparent.

The indicator arm 26, as best shown in FIG. 5, is formed with a downwardly-opening recess 28, extending a substantial distance along the arm 26; and the recess 28 slidably receives an upwardly-extending boss 30 on the base arm 12, the sliding interfit of 28 and 30 being such as to assist the two pieces 12 and 14 to maintain their assembled relationship, with the inner edge 32 of the indicator member 26 in contact with the aforesaid abutment corner 16.

The other end of the indicator member 26 (that is, the end remote from the portion which contacts the abutment 16 and which has the recess 28) is provided with a pair of parallel arms 34, spaced apart by the slot 35, and receiving therebetween the scale-arm 14. A pin 36 interconnects the arms 34, and passes through an elongated slot 38 provided in the scale arm 14, providing that the indicator arm 26 is movable along the scale arm 14 but is maintained connected thereto.

The pin 36 is advantageously provided in the form of a hollow eyelet; and, as shown in FIG. 3, it will be understood that it is operatively headed after assembly to maintain its position maintaining arm 26 and arm 14 an adjustable or relatively movable assembly.

Adjustment-holding means having a spring-tension feature and character are shown by a leaf spring 39 of generally rectangular shape and having a central hole or opening 39a through which the pin 36 is passed. The spring 39 is shown formed of a bowed shape; and, when assembled into the device, its central portion 39b (in the region of its opening 39a) bears against the inner face of the adjacent arm 34 of indicator member 26, and the end-portions 39c of the spring 39 bear against the adjacent face 41 of a recessed groove 43 adjacent the elongated slot 38, the groove 43 providing a raceway or track for the spring 39.

The leaf spring 39, moreover, is of such dimension and formation that it must be slightly resiliently deformed to achieve its assembly; and the resilient deformation which thereafter exists assures a snugness and firmness of any particular setting or reading of the arm 26, against inadvertent slipping of the adjustment, yet it accommodates adjustability when desired.

No clamping means or screw is necessary, and thus the extra bother of such a fastener is avoided. Moreover, the adjustment-holding, which is provided by the spring 39 and the bearing faces of the arm 34 and recess 43, exists wholly within the plane of the device arms, with no protruding portions of screws, knobs, or clamps; and thus the device 10 may be placed flat on the drafting table, regardless of which face of the device is lying downward. This facilitates the device usage of both its scales, as explained further below.

The top or outer edge 44 of the indicator arm 26, which is parallel to its inner or abutment-engageable edge 32, is shown relieved slightly as at 46, on both its faces, providing a raised or under-cut "inking" edge for ink-drawings, regardless of which face is placed downward against the draftsman's paper.

The scale calibrations 24 are provided on both faces of the scale arm 14, also contributing to utility of the device, using either face up.

In use of the device as so far described, that is with the first calibration scale 24, (and assuming a line-measuring operation is to be achieved, rather than laying out a new line to a given slope) the user places the base arm inner edge 18 (or its outer edge 48 which is parallel thereto, both of them providing a reference direction means) in a horizontal position (as indicated by horizontal reference line 50 in FIG. 8); and the edge 44 or edge 32 of the indicator arm 26 is placed along the line to be determined, that is along a line identified by reference numeral 52 in FIG. 8. The arm-edge 32 is kept in contact with the base arm abutment 16, and the angle-change of arm 26 or of the slope of the line 52 is accommodated by the pin 36 sliding in the slot 38.

The instrument 10 is then "read" or observed to determine the slope of the line 52, by observing the intersection of arm-edge 32 with the scale-line 20, and observing the numerical value or reading of the calibrations 24 at that point 54.

In FIG. 10, which is an enlargement of the portions of the tool pertinent to this illustration, the reading of slope is seen to be "six"; that is, the slope of the line 52 has been determined to be "six inches rise per twelve inches run."

(The slope of reference line 56 in FIG. 1 is, similarly, seen to be "twelve inches rise per foot run," by observing the intersection of edges 32 and 20 at point 58, with either of the parallel edge 18 or 48 of base arm 12 set parallel to a horizontal reference line 59.)

Any reading, from zero slope, to a slope designated as "twelve inches rise per twelve inches run" may be determined in the embodiment shown, by the convenient process as thus described. As stated above, the face of the tool 10 hidden in FIGS. 1, 8, and 10 is calibrated (see FIG. 11) similarly to that indicated in FIGS. 1, 8, and 10; thus a slope in either direction is determinable.

To lay out or draw a line to a given slope, using the first calibrations 24 which give a maximum slope of twelve inches rise per twelve inches run, a similar procedure is followed; that is, the slope is set at the given slope by moving the arm 26 to where its edge 32 intersects the first scale-line 20 at the numeral corresponding to the required slope. Then, with the gauge or tool 10 placed on the paper so that the base arm edges 18 and 48 are horizontal (either of them providing a reference direction means for establishing the base arm 12 horizontally), the required line is drawn, along the inking edge 44 of the indicator arm member 26.

It will be observed that the height of the base arm 12 (between its edges 18 and 48) is sufficient so that in any setting of the indicator arm 26 it is supported by the pin 36 and the abutment 16 in a position such that its end adjacent the abutment 16 never extends below the base edge 48.

Now will be discussed the means which accommodates slopes in excess of twelve inches rise per foot of run.

A second scale-line 60 is shown provided parallel to first scale-line 20; and the outer edge 61 of the scale arm 14 is parallel to both lines 20 and 60, as well as to the arm edge 22; thus either of these lines or edges provides a reference direction means, when the device 10 is oriented as in FIGS. 9 and 11 yet to be further described.

A second set of calibrations 62 is marked along the second scale line 60. These second calibrations are not uniform; but instead are of a nature such that for the "twelve"-mark the distance from the base-edge 18 is amount equal to the distance from the corner abutment 16 to the second scale-line 60.

In this second calibration set 62, the markings of the numerals higher than twelve are positioned such that they designate slope when the device 10 is turned ninety degrees from the position heretofore considered in FIGS. 1, 8, and 10.

The numeral markings of the second calibration scale 62 may be laid out as follows: to determine the position, or the distance "Y" perpendicularly away from the base-line edge 18, for any given marking of a numeral "N" of the second calibration scale 62, considering as "X" the perpendicular distance from the corner abutment 16 to the second scale line 60, the values of "Y," "N," and "X" comply with the following equation:

$$\frac{N}{12} = \frac{X}{Y}$$

In using the device 10 to determine or lay out a line whose slope exceeds twelve inches rise per foot of run, the tool 10 is oriented (as shown in FIGS. 9 and 11) with the scale-arm 14 horizontal (as indicated by horizontal reference line 63 in FIG. 9); and the slope-reading is read on second calibration-markings 62 at the intersection 64, of the inner edge 32 of the indicator arm 26, with the second scale-line 60.

Thus, in the example shown in FIGS. 9 and 11, the slope of the reference line 65 is "twenty-four inches per foot of run."

In the FIG. 9 orientation of the device 10 to designate the relatively high slopes, the edge 61 may be positioned along a horizontal straightedge, with no interference by the indicator member 26; for the movable sliding of the pin 36 in the slot 38, together with the slidability of the indicator member 26 along the corner abutment 16, provide that the indicator member 26 lies wholly inwardly of the edge 61 of arm 14 throughout the entire range of slopes associated with the calibrations 62.

FIGS. 9 and 11 illustrate the advantageous feature of the relatively higher slopes being readable always by lines or edges which intersect at least an angle if forty five or edges which intersect at least an angle of forty-five degrees, providing ease of reading.

The first calibration scale 24 is shown (FIG. 10) as having its numerals upright when the base arm 12 is horizontal, and the second calibration scale 62 is shown (FIG. 11) as having its numerals upright when the scale arm 14 is horizontal, thereby providing a constant reminder to the user as to the proper orientation of the device in determining or laying out slope. Thus the use is convenient and error-minimizing, even though the extreme awkwardness and bulk of a single-scaled instrument is avoided.

(Divisions of the calibration sets 24 and 62 are shown schematically only; in practice, with a tool larger than that illustrated, finer divisions would desirably be provided, and markings of scale 62 could and would go higher than the "sixty"-mark shown if desired.)

A recess 66, on both sides of scale arm 14 in the area between the scale-lines 20 and 60, provides that the calibration markings 24 and 62 are maintained slightly raised from the drawing paper, thus prolonging their legability.

A slope gauge tool according to the concepts of the present invention thus provides advantages and features of economy, utility, handiness and convenience of use, obtaining high slope values without a corresponding elongation of the scale-arm, achieving the several foregoing and other advantages pointed out in the description and inherent in the inventive concepts; and the device is useful both in the laying out or drawing of lines to a certain slop, and in the determination of the slope of a given line.

It will be understood that modifications and variations may be effected without departing from the scope of the novel concepts of the invention. Accordingly, the invention is not to be limited to the specific form or arrangement of parts or components herein described or shown in the embodiment which illustrates the inventive concepts.

What is claimed is:

1. A slope indicator gauge and drafting tool comprising a base arm, and a scale arm attached to one end of said base arm at right angles thereto, said base arm and said scale arm each having means thereon defining reference direction means, said scale arm having an elongated slot therein parallel to the reference direction means thereon, said scale arm being provided with two scales parallel to the reference direction means thereon and each having calibration indicia, one scale giving slope designations of relatively low slopes when the reference direction means on the base arm is in a horizontal position and the other for high slopes when the reference direction means on the scale arm is in a horizontal position, the numerals of each scale increasing in opposite directions and arranged so that when the base arm is horizontal the numerals on the first scale are upright, and when the scale arm is horizontal the numerals on the second scale are upright, said base arm having an abutment means at the other end thereof at a predetermined distance from the scale arm, and an indicator arm having means on one end thereof for relatively movable engagement with the abutment means and means at the other end overlying the scale arm and the scales thereon for sliding engagement within the slot, said last mentioned means also providing an index means for cooperation with the scales.

2. The invention as set forth in claim 1, wherein the last mentioned means includes pin means operatively extending through said slot, and the relatively movable engagement of the indicator arm with the said abutment means is a relative sliding thereof.

3. The invention as set forth in claim 1, wherein the means on one end of the indicator arm maintains the indicator arm in the same general plane as the abutment means and the scales.

4. The invention as set forth in claim 1 wherein said abutment means comprises a fixed boss and said means on one end of said indicator arm comprises a groove which relatively slidably receives the boss for relatively interconnecting the indicator arm and the boss permitting relative sliding movement thereof.

5. The invention as set forth in claim 1 in a combination in which:

the said calibration markings of the said second scale yielding a designation of units of rise per twelve units of run, in conformity to the following formula:

$$\frac{N}{12} = \frac{X}{Y}$$

in which formula: "N" is any given numeral of said second scale calibrations; "Y" is the distance of the "N" calibration marking measured along a reference line projecting perpendicularly away from a line through said locating abutment and extending parallel to the said first reference direction means; and "X" is the perpendicular distance from said locating abutment to the said projecting reference line.

6. The invention as set forth in claim 1 in a combination in which the said scale arm is provided with both said first and second scales on both faces thereof.

7. The invention as set forth in claim 6 wherein the means at the other end of said indicator arm comprises a pair of opposed arms overlying opposite faces of said scale arm so as to respectively overlie said scales on both faces of said scale arm.

8. The invention as set forth in claim 1 in a combination in which releasable holding means are provided to retain any given setting of the said indicator arm, but permit the adjustment of the setting thereof of the relative positioning of the said indicator member with respect to the said scales.

9. The invention as set forth in claim 1, in a combination in which interconnection means including spring means are provided, snugly and firmly frictionally retaining said indicator arm in a set position relative to said scales, against inadvertent slipping of any given position of relative adjustment or setting of said indicator arm and said scales, yet permitting the user to alter said adjustment or setting as desired.

10. The invention as set forth in claim 9, in a combination in which the said spring means include a spring member operatively disposed between said indicator arm and said scale arm, the spring member being relatively fixed to one of said indicator arms and said scale arm but relatively movable with respect to the other of said indicator arms and said scale arm.

11. The invention as set forth in claim 9 in a combination in which the indicator arm is provided with a pin means operatively extending through said slot, the said spring means being provided with an opening means through which said pin means is passed.

12. The invention as set forth in claim 10 in a combination in which the indicator arm is provided with a pin means operatively extending through said slot, the said scale arm being provided with recessed groove means adjacent said slot and providing a trackway against which said spring operatively bears and along which said spring travels in the altering of the adjustment of the said indicator arm with respect to said scales.

13. The invention as set forth in claim 10 in a combination in which the said interconnection means includes the provision of a pair of spaced arm-portions of said indicator arm and a recess provided between said arm-portions, the assembly of the indicator arm to the device being by the arm-portions straddling the said scale arm of the device, and the operative bearing of said spring against the said indicator arm being operatively against the inner face of one of said arm-portions.

14. The invention as set forth in claim 12 in a combination in which the said recessed groove means provides a region accommodating said spring generally within the plane of the said scale arm of said device.

15. The invention as set forth in claim 13 in a combination in which the operative bearing of said spring against the said scale arm being operatively against the adjacent face of a recessed groove means provided in said scale arm adjacent said slot.

16. A slope indicator gauge and drafting tool comprising a base arm, and a scale arm attached to one end of said base arm at right angles therto, said base arm and said scale arm each having means thereon defing reference direction means, said scale arm having an elongated recess means therein parallel to the reference direction means thereon, said scale arm being provided with two scales parallel to the reference direction means thereon and each having calibration indicia, one scale giving slope designations of relatively low slopes when the reference direction means on the base arm is in a horizontal position and the other for high slopes when the reference direction means on the scale arm is in a horizontal position, the numerals of each scale increasing in opposite directions, said base arm having an abutment means at the other end thereof at a predetermined distance from the scale arm, and an indicator arm having means on one end thereof for relatively movable engagement with the abutment means and means on the other end slidably engageable with the said recess means and having adjacent thereto means overlying the said scale arm and the scales thereon, said overlying means providing an index means for cooperation with the scales;

in a combination in which interconnection means including spring means are provided, snugly and firmly frictionally retaining said indicator arm in a set position relative to said scales, against inadvertent slipping of any given position of relative adjustment or setting of said indicator arm and said scales, yet permitting the user to alter said adjustment or setting as desired.

References Cited

UNITED STATES PATENTS

| 189,311 | 4/1877 | Klinglesmith | 33—92 |
| 987,917 | 3/1911 | Saas | 33—92 |
| 1,370,605 | 3/1921 | Magill | 33—92 |

FOREIGN PATENTS

| 24,495 | 6/1906 | Austria. |

HARRY N. HAROIAN, Primary Examiner

U.S. Cl. X.R.

33—94

UNITED STATES PATENT OFFICE
CERTIFICATE OF CORRECTION

Patent No. 3,513,551                                                          May 26, 1970

Hans F. Geiger

It is certified that error appears in the above identified patent and that said Letters Patent are hereby corrected as shown below:

Column 3, line 4, "an" should read -- in --. Column 4, line 75, cancel "or edges which intersect at least an angle if forty five". Column 5, line 22, "legability" should read -- legibility --; line 31, "slop" should read -- slope --. Column 6, line 47, "arms" should read -- arm --; line 49, "arms" should read -- arm --. Column 7, line 8, "therto" should read -- thereto --; line 9, "defing" should read -- defining --. Column 8, list of References Cited, add the following:

| | | |
|---|---|---|
| 303,861 | 8/1884 | King---------33-94x |
| 1,621,192 | 3/1927 | Dyke---------33-92 |

Signed and sealed this 12th day of January 1971

(SEAL)
Attest:

EDWARD M. FLETCHER, JR.                            WILLIAM E. SCHUYLER, JR.
Attesting Officer                                          Commissioner of Patents